United States Patent [19]
Watson et al.

[11] 3,852,160
[45] Dec. 3, 1974

[54] DISTILLATION OF PENTACHLOROPHENOL WITH SALICYLALDEHYDE AND WATER

[75] Inventors: William David Watson; Erwin H. Kobel, both of Midland, Mich.

[73] Assignee: The Dow Chemical Company, Midland, Mich.

[22] Filed: May 23, 1973

[21] Appl. No.: 363,224

[52] U.S. Cl............... 203/6, 203/38, 203/92, 203/54, 203/62, 260/623 R, 260/623 H
[51] Int. Cl............... B01d 3/34, C07c 39/36
[58] Field of Search............... 203/54, 6, 62, 96, 91; 260/623 R, 623 H

[56] References Cited
UNITED STATES PATENTS
2,662,918  12/1953  Spaulding ............... 260/623 H
3,769,353  10/1973  Francis et al. ............... 260/623 H
3,770,835  11/1973  Garabedian ............... 260/623 R FOREIGN PATENTS OR APPLICATIONS
1,246,529  9/1971  Great Britain ............... 260/623 R OTHER PUBLICATIONS
Biltz et al., Berichte 37, 4017, 4018 (1904).

Primary Examiner—Wilbur L. Bascomb, Jr.
Attorney, Agent, or Firm—David T. Thurston

[57] ABSTRACT

Purified pentachlorophenol is recovered in good yield by distilling the commercially available grade in the presence of salicylaldehyde and water under reduced pressure. The purified product is nearly colorless and nonblooming and it is essentially free of polychlorinated dibenzo-p-dioxins and phenoxyphenols.

3 Claims, No Drawings

3,852,160

DISTILLATION OF PENTACHLOROPHENOL WITH SALICYLALDEHYDE AND WATER

BACKGROUND OF THE INVENTION

This invention relates to an improved method whereby pentachlorophenol can be purified by distillation with high recovery and minimal decomposition and side reactions. A product which is essentially free of undesirable impurities and unsatisfactory physical properties is thereby obtained.

Pentachlorophenol is a well known and widely used fungicide and preservative which is particularly useful for preserving wood exposed to attack by the elements. Commercially available pentachlorophenol in the past has been a relatively dark colored solid sold in the form of flakes and prills or beads. This material had an annoying characteristic of blooming or subliming to form a surface layer of easily dislodged fine crystalline dust which is intensely irritating to skin and mucous membranes. The dark color is caused by high molecular weight tarry impurities and is of itself no particular disadvantage for many uses such as the protection from rot of posts and poles designed for sinking in the ground. However, the color is disadvantageous for other uses, for example wood used in outdoor furniture, porches, and decks. Of perhaps more serious consequence is the recent discovery of the toxic properties of polychlorinated dibenzo-p-dioxins which fortunately constitute a relatively small proportion of the high molecular weight impurities. It has also been found that other polychlorinated polynuclear impurities, the chlorinated phenoxyphenols, are a primary cause of blooming of impure pentachlorophenol.

Impurities such as these can be removed by recrystallization, but this process is usually too expensive and slow for use with a bulk chemical. An obvious means for getting rid of high boiling impurities is distillation and pentachlorophenol has been distilled to purify it, see Biltz, et al., Berichte 37, 4018 (1904). However, pentachlorophenol is not completely stable at elevated temperatures and it tends to decompose and undergo side reactions to some extent during distillation to form large volumes of HCl and tar, particularly in the presence of the small amounts of aluminum and iron chlorides present in most commercially available material. Exposure of the material to water deactivates these metal chlorides but an undesirable degree of decomposition and side reaction persists at distillation temperatures. It is known that small amounts of salicylaldehyde stabilize pentachlorophenol at elevated temperatures, see British Pat. No. 1,246,529, but even in its presence, an undesirable amount of decomposition continues in the prolonged heating necessary for distillation.

SUMMARY OF THE INVENTION

It has now been found that pentachlorophenol is stabilized and decomposition during distillation is effectively inhibited by the presence of a combination of water and salicylaldehyde. The quantity of this stabilizing combination is not critical, so long as a significant amount of each component is present, but preferably at least about 0.05 percent of salicylaldehyde is employed, based on the weight of pentachlorophenol. The distillation is carried out at subatmospheric pressure, preferably below about 100 mm. Hg.

DETAILED DESCRIPTION

It is known, as previously mentioned, that salicylaldehyde inhibits decomposition of molten pentachlorophenol and it might be expected to have a similar effect when the pentachlorophenol is distilled. It is also common practice, of course, to deactivate traces of ferric chloride or aluminum chloride by adding water to Friedel-Crafts reaction mixtures before distilling the products. However, the stabilizing effect found when technical grade pentachlorophenol is distilled in the presence of the claimed combination is considerably greater than any additive effect which might be predicted from the known and demonstrated effects of salicylaldehyde and water used separately. The claimed invention, therefore, is based on surprising synergistic stabilizing effect exerted by the two components when used in combination.

The water component can be added in any of several convenient ways, either before or during the distillation. Liquid water may be added or the pentachlorophenol may be contacted with steam. Even contact of the pentachlorophenol with moist air is effective.

A suitable proportion of salicylaldehyde is about 0.05–2 percent by weight and preferably about 0.1–1 percent. These figures represent practical limits rather than critical amounts, for any significant amount provides some stabilizing effect. Larger amounts actually begin to show a deleterious effect. At least about 0.01 percent of water is preferred and about 0.05–0.5 percent is most preferred. Larger quantities can be used but give little or no added benefit.

For reasons of convenience and avoidance of significant decomposition even in the presence of the stabilizing combination, the distillation is carried out at subatmospheric pressure, preferably below 100 mm. Hg absolute, and most preferably at an absolute pressure sufficiently low to keep the distillation head temperature below about 230°C., i.e., a pressure below about 80 mm. Hg, but sufficiently high to avoid freezing of the pentachlorophenol in the head.

The distilled product is typically a light yellow crystalline solid having little or no tendency to bloom. When it is converted to a granular form such as flakes or beads, it remains free flowing and essentially unchanged in appearance even after long storage.

Examples 1–2

Samples of 500 g. technical grade pentachlorophenol prills with or without additive as noted were distilled at 75 mm. Hg absolute pressure through a distillation column packed with stainless steel column packing in about 1 hour of distillation time to a final pot temperature of about 270°C. except as noted. The pentachlorophenol had been made by chlorination of chlorophenols in the presence of aluminum chloride. The residue remaining in the distillation pot was then held at the final pot temperature for an additional four hours to simulate recycling of tars through a heat exchanger in a commercial distillation unit. The HCl evolved during the distillation and during the hold period was monitored by scrubbing the vent gas through a known quantity of 1N NaOH and titrating with 1N HCl. The results are listed in the table along with those of various control experiments with or without additives as noted which were run for purpose of comparison. The products obtained by distillation in the presence of the salicylaldehyde-water combination were typically about 90–95 percent pentachlorophenol with the remainder consisting essentially of tetrachlorophenol. Only trace amounts if any of polychlorinated phenoxyphenol and polychloro dibenzo-p-dioxin were present.

tively high, comparable to that obtained in the control experiments of Table 1 when there was no additive or when water alone or salicylaldehyde alone was used. This indicates a continuing, unacceptably high rate of decomposition during the long heating periods re-

TABLE 1

| Example No. | Additive | Wt. % Recovery Distillate | Residue | Millimoles HCl Evolved During Distillation | At 270–300°C. |
|---|---|---|---|---|---|
| 1 | 1.9 g. salicylaldehyde + water* | 95.0 | 4.9 | 1.1 | 3.0 |
| 2 | 1.9 g. salicylaldehyde + 0.37 g. water | 92.4 | 7.4 | 0.2 | 1.7 |
| A | none | 84.5 | 13.8 | 113.7 | 40.7 |
| B | water* | 93.3 | 6.0 | 11.6 | 34.2 |
| C | 1.9 g. salicylaldehyde | 89.2 | 9.9 | 25.6 | 34.3 |
| D | 3.8 g. salicylaldehyde | 84.9 | 13.8 | 122.8 | 55.8 |

*water was added by blowing moist air through the prills for 10–15 minutes.

Surprisingly, the highly effective inhibition of decomposition during distillation shown by the salicylaldehyde-water combination appears to be unique to that combination and the effect is not shown to that extent by mixtures of water with similar aromatic aldehydes. Table 2 lists the results obtained when the procedure of Example 2 is repeated using aromatic aldehydes other than salicylaldehyde.

quired in a plant distillation procedure.

We claim:

1. A process for purifying impure pentachlorophenol which comprises distilling said pentachlorophenol at subatmospheric pressure in the presence of contacting water and about 0.05–2 percent of salicylaldehyde based on the weight of pentachlorophenol, thereby separating purified pentachlorophenol as a distillate from

TABLE 2

| Additive | Wt. % Recovery Distillate | Residue | Millimoles HCl Evolved During Distillation | At 270–300°C. |
|---|---|---|---|---|
| 1.9 g. p-hydroxy-benzaldehyde + 0.37 g. H₂O | 93.2 | 6.6 | 1.5 | 21.9 |
| 1.9 g. benzaldehyde + 0.37 g. H₂O | 92.0 | 7.7 | 3.8 | 19.6 |
| 1.9 g. O-anisaldehyde + 0.37 g. H₂O | 92.6 | 7.2 | 2.5 | 29.4 |
| 1.9 g. 5-methyl-salicylaldehyde + 0.37 g. H₂O | 92.6 | 7.3 | 0.6 | 52.3 |

It will be noted in the results of Table 2 that although the combinations of water with the other aromatic aldehydes gave reasonably good results in the recovery of distilled pentachlorophenol, in tar production, and in the HCl evolved during distillation, the HCl evolved from the tar residue during the holding period was relatively higher boiling impurities.

2. The process of claim 1 wherein about 0.1–1 percent of salicylaldehyde and at least about 0.01 percent of water are present.

3. The process of claim 2 wherein the distillation pressure is below 100 mm. Hg absolute.

* * * * *